United States Patent [19]

Shioi

[11] Patent Number: 4,785,575

[45] Date of Patent: Nov. 22, 1988

[54] HORTICULTURAL DEVICE FOR RAISING GARDEN PLANTS UTILIZING MAGNETISM

[75] Inventor: Kazuhiro Shioi, Tokyo, Japan

[73] Assignee: Rainbow Yakuhin Kabushiki Kaisha, Tokyo, Japan

[21] Appl. No.: 55,546

[22] Filed: May 29, 1987

[30] Foreign Application Priority Data

Jun. 5, 1986 [JP] Japan .................................. 61-130967
Aug. 12, 1986 [JP] Japan .................................. 61-187673

[51] Int. Cl.⁴ ........................ A01C 1/00; A01G 29/00
[52] U.S. Cl. ........................................ 47/1.3; 47/48.5
[58] Field of Search .................................. 47/1.3, 48.5

[56] References Cited

U.S. PATENT DOCUMENTS 4,056,892 11/1977 Brucato et al. ....................... 47/48.5
4,361,983 12/1982 Wilson ................................. 47/48.5
4,381,623  5/1983 Koistinen ............................. 47/48.5

FOREIGN PATENT DOCUMENTS 0196976  8/1986 European Pat. Off. ............... 47/1.3
59643119 1/1979 U.S.S.R. ............................... 47/1.3

OTHER PUBLICATIONS

The Effect of Magnetic Fields as Young Satsuma Orange Trees (1967).

Primary Examiner—Robert A. Hafer
Assistant Examiner—Charles H. Sam
Attorney, Agent, or Firm—Finnegan, Henderson, Farabow, Garrett & Dunner

[57] ABSTRACT

A horticultural device utilizing magnetism for raising plants includes a plate-shaped section in which a fertilizer is imbedded, and a rod-shaped section extending from the bottom side of the plate-shaped section and having a fluid flow passageway, at least a portion of the device having a magnetic property. The rod-shaped section is thrust into soil surrounding a plant until the plant-shaped section contacts the soil surface. The fertilizer carried in the plate-shaped section is gradually dissolved and converted into a magnetized fertilizer solution by watering, the fertilizer solution dispersing itself into the soil through the liquid flow passageway of the rod-shaped section.

8 Claims, 3 Drawing Sheets

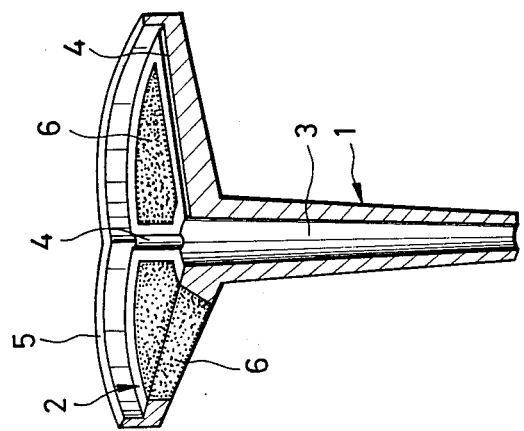
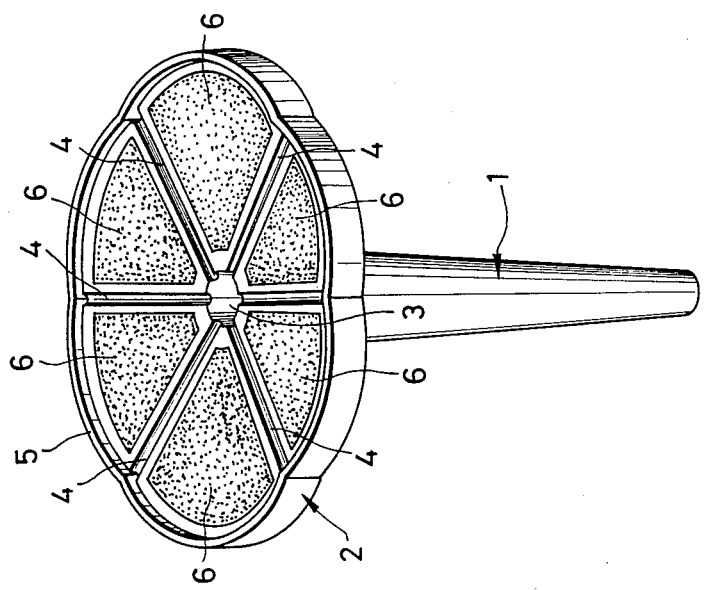

HORTICULTURAL DEVICE FOR RAISING GARDEN PLANTS UTILIZING MAGNETISM

BACKGROUND OF THE INVENTION

1. Field of the Invention:

This invention relates to a horticultural device for raising garden plants though use of magnetism. More particularly, the invention relates to a horticultural device comprising a plate-shaped section in which a fertilizer is imbedded, and a rod-shaped section extending from the bottom side of the plate-shaped section and having or not having a fluid flow passageway, in which at least a portion of the device has a magnetic property.

2. Description of the Prior Art:

It is widely known that magnetism has a profound effect upon the growth of plants. For example, the relationship between plants and magnetism is discussed in "Do Living Things Respond to Magnetism?", published by Kodansha in November of 1985. "Plants and Magnetic Fields", published by Magnesium Kenkyukai in 1985, investigates the growth of rice plants and discloses that the presence of a magnetic field assists rice plants in the absorption of fertilizer. "The growth effect of Germanium on growth of Tangerine Saplings", published by kajitsu Nippon in July of 1966, reports that the total amount of phosphorus absorbed is increased by the installation of magnets, this being based on measurements of elements within the leaves of tangerine saplings. Further, it has been reported that use of magnetized water, obtained by contacting water with a magnet, increases the growth of rice, onions and other vegetables and grains by 10–45% and hastens maturity by 1–3 days ("Magnetic Treatment of Water", published by Nisso Tsushinsha (Japanese-Soviet news agency) on Jan. 25, 1984). More specifically, when plants are subjected to magnetism, the germination of seeds is affected, the growth of the plants is hastened, leaf color grows darker, the plants strongly resist damage by disease and pests, and the plants grow without root rot. Japanese Patent Publication No. 52-5716 discloses a magnet for plant growth in which a powdered strongly magnetic material, an aqueous caking substance and a deliquescent substance are mixed, compression molded and then magnetized. Japanese Patent Publication No. 40-11328 discloses a method of increasing the growth of a living body by utilizing magnetic energy.

Thus, it is evident that the application of magnetism to plants promotes plant growth. In the prior art, however, the magnets and fertilizer are used separately, so that the efficient absorption of the fertilizer by the plants due to the applied magnetism does not necessarily take place at all times. In addition, sufficient care is not taken with respect to the effective utilization of magnetized water.

SUMMARY OF THE INVENTION

Accordingly, an object of the present invention is to provide a horticultural device utilizing magnetism which eliminates the drawbacks encountered in the prior-art use of magnetism for horticultural purposes.

Another object of the invention is to provide a horticultural device utilizing magnetism in which the absorption of fertilizer by plants due to magnetism and the utilization of magnetized water are performed efficiently at all times.

Still another object of the invention is to provide a horticultural device utilizing magnetism in which magnets can be changed freely and simply so that plants can be subjected to magnetism at the required time.

According to the present invention, the foregoing objects are attained by providing a horticultural device comprising a plate-shaped section in which a fertilizer is imbedded, and a rod-shaped section extending from the bottom side of the plate-shaped section and having or not having a fluid flow passageway, in which at least a portion of the device has a magnetic property. When the device is used, the rod-shaped section is thrust into soil at the periphery of plant. A fertilizer carried in the plate-shaped section is gradually dissolved and converted into a fertilizer solution by watering, the fertilizer solution dispersing itself into the soil through the liquid flow passageway of the rod-shaped section. Since the device has a magnetic property, the fertilizer solution is magnetized sufficiently and acts on the plant as magnetized water.

The plate-shaped section can consist of plastic, metal, paper, cloth or the like. It is also possible to use a material which dissolves and decomposes during watering. The rod-shaped section can consist of metal or a metal-containing plastic. At least a portion of the plate-shaped section or rod-shaped section is provided with a magnetic property. The plate-shaped and rod-shaped sections can be of any size and formed into any shape. These sections can be fixed by means such as integral molding, welding or fitting one into the other, or an arrangement can be adopted in which the plate-shaped section is freely movable along the rod-shaped section. Preferably, the plate-shaped section is formed into a flower-shaped configuration to provide the device with an attractive appearance.

Any number of the rod-shaped sections can be extended from the plate-shaped section at any locations thereon. The rod-shaped section need not have the shape of a circular cylinder but can be prismatic if so desired, there being no particular limitation upon its shape. The liquid flow passageway can pass through the rod-shaped section and can be of any shape, size and number. Alternatively, the liquid flow passageway can be a groove formed in the surface of the rod-shaped section. A compound fertilizer containing nitrogen, phosphoric acid and potash, or a mixture of this fertilizer and a plant hormone, insecticide and other substances useful for plant growth, is compressed into bulk form, particles or a sheet-like configuration carried in the plate-shaped section by being imbedded or bonded thereto. The fertilizer mixture elutes from the portion contacted by water during watering. The amount of fertilizer that elutes is regulated by adjusting the compacting strength, which depends upon the compressing force, or the area contacted by water.

The plate-shaped section has the form of a shallow dish the periphery of which has a raised edge, and can have a slight downward incline toward the rod-shaped section. Grooves can be provided extending radially from a opening in the liquid flow passageway. Adopting such an arrangement assures that the fertilizer solution will be fully magnetized by watering, thereby improving the overall effectiveness of the device.

In operation, the rod-shaped section is thrust into the soil surrounding a plant until the plate-shaped section carrying the fertilizer contacts the surface of the soil. The device and the plant are watered at the prescribed times. The water which falls onto the plate-shaped section gradually dissolves the fertilizer from the surface thereof and results in a fertilizer solution. The solution also is acted upon by the magnetism of the device and is magnetized thereby before flowing out into the soil through the liquid passageway of the rod-shaped section. The plant is influenced by the magnetism so as to efficiently absorb the fertilizer, as a result of which growth of the plant is promoted.

Using the device of the invention makes it possible to utilize fertilizer efficiently and produces sufficiently magnetized water in the form of a fertilizer solution. The invention is not limited to garden plants but hastens the growth and maturation of vegetables and grains as well.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is an external perspective view illustrating an embodiment of a horticultural device according to the present invention;

FIG. 2 is a sectional view of the device shown in FIG. 1;

DESCRIPTION OF THE PREFERRED EMBODIMENTS

Preferred embodiments of the invention will now be described with reference to the drawings.

Figure 3:
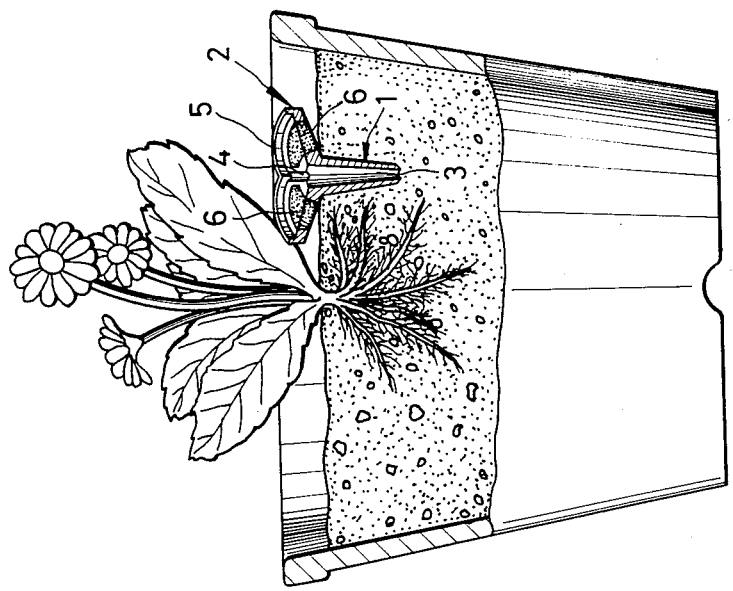
FIG. 3 is a view useful in describing the use of the device.

A first embodiment of a horticultural device according to the invention is illustrated in FIGS. 1 through 3, in which FIG. 1 is an external perspective view, FIG. 2 is a sectional view and FIG. 3 a view useful in describing the use of the device. The device comprises a rod-shaped section 1 having a hollow central portion serving as a liquid flow passageway 3, and a plate-shaped section 2. The sections 1, 2 are integrally molded of plastic containing metal powder. It has been proven that orienting the root of a plant in the direction of the south pole will maximize the rate at which the plant grows (see Talakasovay "Magnetic Tendencies of Plants and its Nature", 1960). Therefore, the plate-shaped section 2 is magnetized to have north polarity, and the rod-shaped section 1 is magnetized to have south polarity. The periphery of the plate-shaped section 2 is provided with a raised edge 5, and the surface of the plate-shaped section 2 is formed to include grooves 4 radiating from an opening at the upper portion of the flow passageway 3. In use, the rod-shaped section 1 is thrust into soil surrounding a plant until the plate-shaped section 2 makes contact with the surface of the soil. A chemical fertilizer 6 having a 30-10-10 composition is compressed into bulk form imbedded in a plurality of holes formed in the plate-shaped section 2. When the device is used, watering is repeated until the compressed chemical fertilizer 6 is completely dissolved away. At such time the device is exchanged for a new one.

Figure 4:
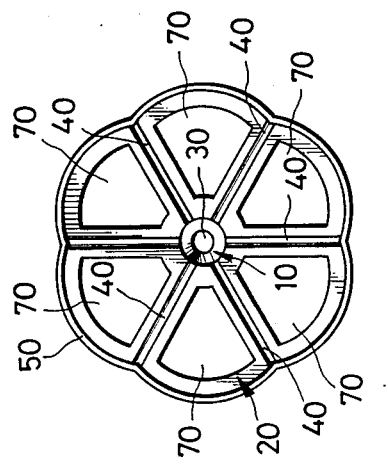
FIG. 4 is a plan view illustrating another embodiment of a horticultural device according to the present invention.
Figure 5:
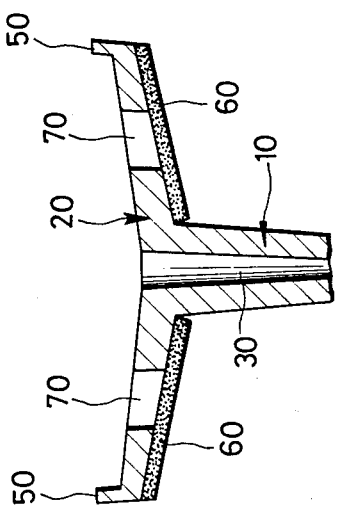
FIG. 5 is a sectional view of the device shown in FIG. 4.

FIGS. 4 and 5 illusstrate another embodiment of the present invention. The horticultural device comprises a rod-shaped section 10 and a plate-shaped section 20 integrally molded from a plastic having a magnetic property. The rod-shaped section 10 is magnetized to have south polarity and has a hollow central portion serving as a liquid flow passageway 30. The plate-shaped section 20 has a peripheral portion provided with a raised edge 50 and grooves 40 communicating with the passageway 30 and is formed so as to have a slight downward incline toward the rod-shaped section 10. The grooves 40 divide the plate-shaped section 20 into petal-shaped segments to provide the device with an attractive appearance. The plate-shaped section 20 is provided with holes 70 for dissolving a compressed fertilizer 60. A 30-10-10 chemical fertilizer 60 compressed into sheet form is adhered to the bottom portion of the plate-shaped section 20 by using paste, glue or other adhesive agent which is not chemically harmful to plants. The rod-shaped section 10 is thrust into soil surrounding a plant until the plate-shaped section 20 makes contact with the soil surface. Water which has collected in the plate-shaped section 20 by watering gradually dissolves the chemical fertilizer 60 through the holes 70 and is magnetized sufficiently before flowing out of the passageway 30. Some of the water is absorbed directly into the soil upon soaking the fertilizer 60 and acts on the plant as a magnetized fertilizer solution. The device is exchanged for a new one when all of the fertilizer 60 is expanded.

Figure 6:
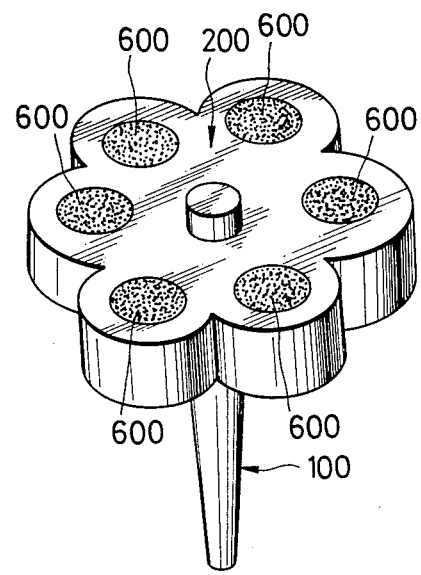
FIG. 6 is an external perspective view of a third embodiment of the invention.
Figure 7:
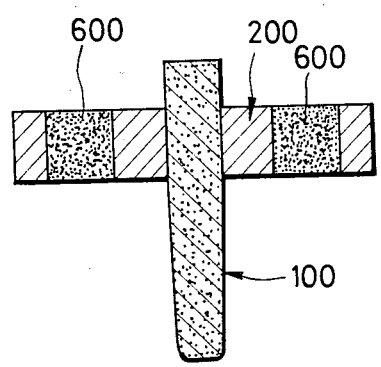
FIG. 7 is a sectional view of the third embodiment.

FIG. 6 is an external perspective view illustrating a third embodiment of the device according to the invention, and FIG. 7 is a sectional view of the same. The device includes a plate-shaped section 200 holding a rod-shaped magnet 100 and consisting of a porous plastic which exhibits water permeability. A 30-10-10 fertilizer 600 compressed into bulk form is imbedded in the plate-shaped section 200, which is capable of being moved along the rod-shaped magnet 100.

In use, the south pole end of the rod-shaped magnet 100 is thrust into the soil surrounding a plant until this end of the magnet is at approximately the same depth as the root of the plant. The plate-shaped section 200 is moved along the rod-shaped magnet 100 until the bottom surface thereof contacts the surface of the soil. Watering is carried out until the compressed chemical fertilizer 600 is completely dissolved. At this time the used plate-shaped section 200 is removed together with the rod-shaped magnet 100 and is replaced by a new device used in the manner described above.

As many apparently widely different embodiments of the present invention can be made without departing from the spirit and scope thereof, it is to be understood that the invention is not limited to the specific embodiments thereof except as defined in the appended claims.

What we claim is:

1. A horticultural device utilizing magnetism for insertion into the soil adjacent a plant comprising;
    a plate-shaped section for receiving water having top and bottom sides and a plurality of holes extending therethrough;
    at least one rod-shaped section extending downwardly from the bottom side of the plate-shaped section and having a liquid flow passageway extending through the rod-shaped section that is open at both ends, said rod-shaped section containing magnetized metal powder, whereby a portion of the water received by the plate-shaped section flows down through the passageway and is magnetized before flowing out into the soil; and a sheet of compressed fertilizer adhered to the bottom side of the plate-shaped section and covering said holes whereby a portion of the water received in the plate-shaped section also passes through said holes and gradually dissolves the fertilizer before passing into the soil as a fertilizer solution.

2. The device of claim 1, wherein the plate-shaped section also contains magnetized metal powder to provide a magnetized fertilizer solution.

3. The device of claim 2, wherein the plate-shaped section and the rod-shaped section are integrally molded of a plastic containing the magnetized metal powder.

4. The device of claim 2, wherein the upper end of the rod-shaped section and the plate-shaped section have north polarity and the lower end of the rod-shaped section has south polarity.

5. The device of claim 1, wherein the plate-shaped section is dish shaped to hold a supply of water.

6. The device of claim 1, wherein the plate-shaped section has a circumferentially extending raised edge to hold a supply of water.

7. The device of claim 1, having one rod-shaped section that extends downwardly from the center of the plate-shaped section.

8. The device of claim 7 wherein the plate-shaped section has a plurality of radially extending grooves that channel the water to the passageway in the rod-shaped section.

* * * * *